Feb. 10, 1953  E. J. SIMANEK  2,627,944
BRAKE ARRANGEMENT
Filed April 30, 1948  3 Sheets-Sheet 1

INVENTOR
EDWARD J. SIMANEK
BY
ATTORNEYS

Feb. 10, 1953 — E. J. SIMANEK — 2,627,944
BRAKE ARRANGEMENT
Filed April 30, 1948 — 3 Sheets-Sheet 2

INVENTOR
EDWARD J. SIMANEK
BY
ATTORNEY

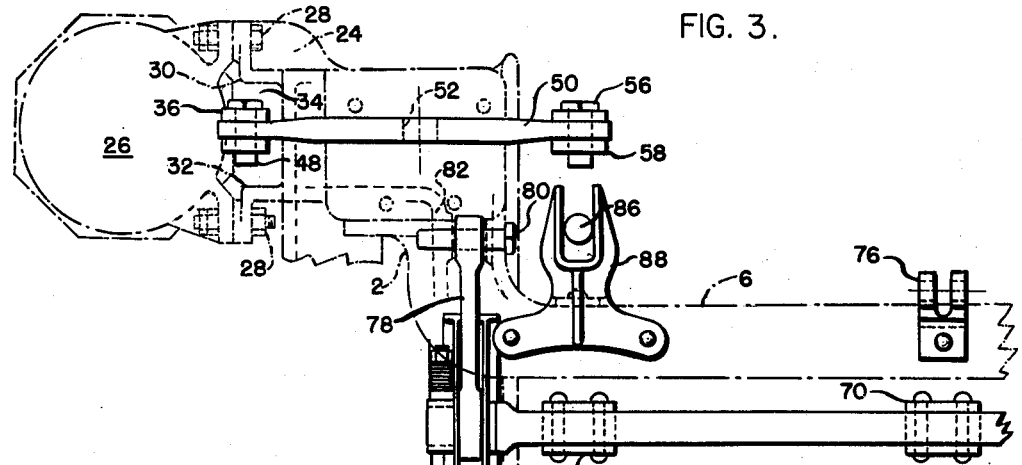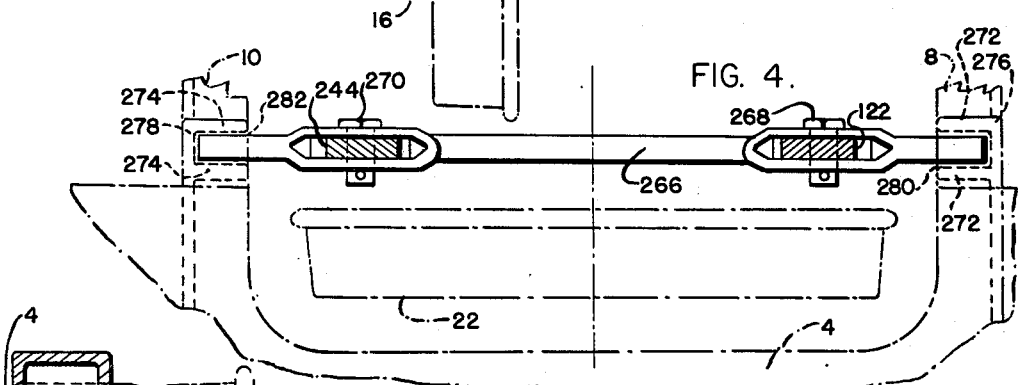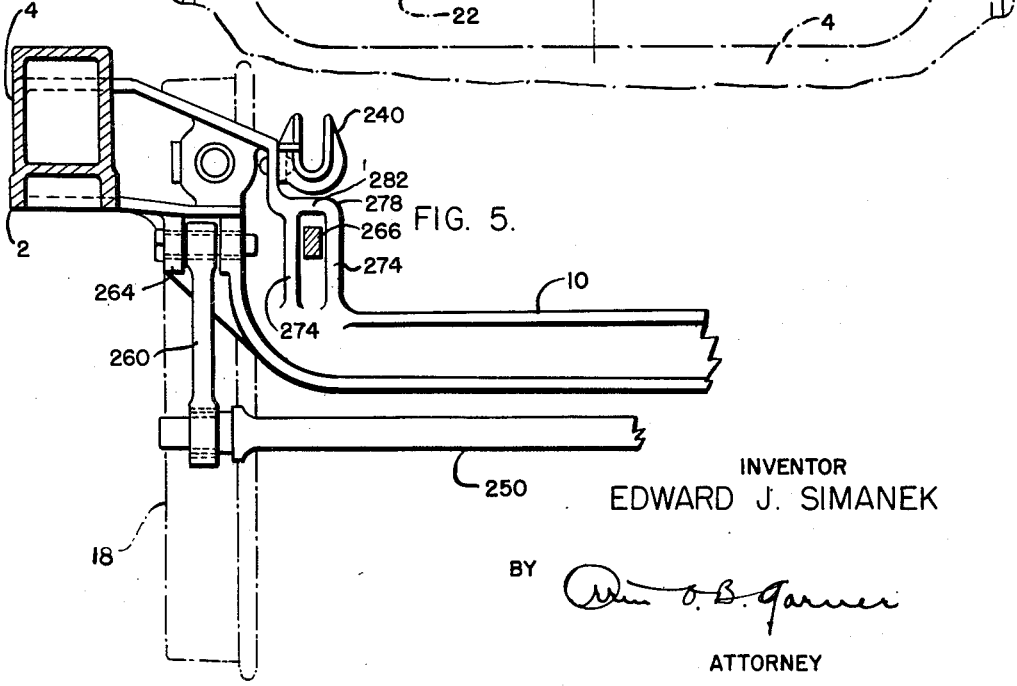

Patented Feb. 10, 1953

2,627,944

UNITED STATES PATENT OFFICE 2,627,944

BRAKE ARRANGEMENT

Edward J. Simanek, Chicago, Ill., assignor to American Steel Foundries, Chicago, Ill., a corporation of New Jersey Application April 30, 1948, Serial No. 24,179

10 Claims. (Cl. 188—46)

This invention relates to railway brake equipment.

One object of the invention is to provide a novel brake rigging for a railway truck which is of simple design and permits of ready application to such truck.

A further object of the invention is to devise an arrangement wherein opposite ends of the brake rigging are actuated by independent power means.

My invention contemplates a brake arrangement comprising a cylinder mounted at each end of the truck frame, the cylinders being operatively connected to opposite ends of the brake rigging associated with the truck.

A different object of the invention is to provide in a six wheel truck having spaced end wheel and axle assemblies and an intermediate wheel and axle assembly, novel means for guiding that portion of the brake rigging associated with the intermediate wheel and axle assembly.

A further object of the invention is to devise a novel brake arrangement so constructed and arranged that the reactive forces of the brake rigging during braking operation will be distributed between the ends of the frame.

These and other objects of the invention will be apparent from the specification and the drawings wherein certain parts may be omitted in one view where shown in another to more clearly illustrate the invention.

In the drawings:

Figure 3 is an end view taken from the right of the structure as shown in Figures 1A and 2A;

Figure 4 is a fragmentary sectional view taken substantially on the line 4—4 of Figures 2 and 2A;

Figure 5 is a fragmentary sectional view taken substantially on the line 5—5 of Figure 2.

Figure 1:
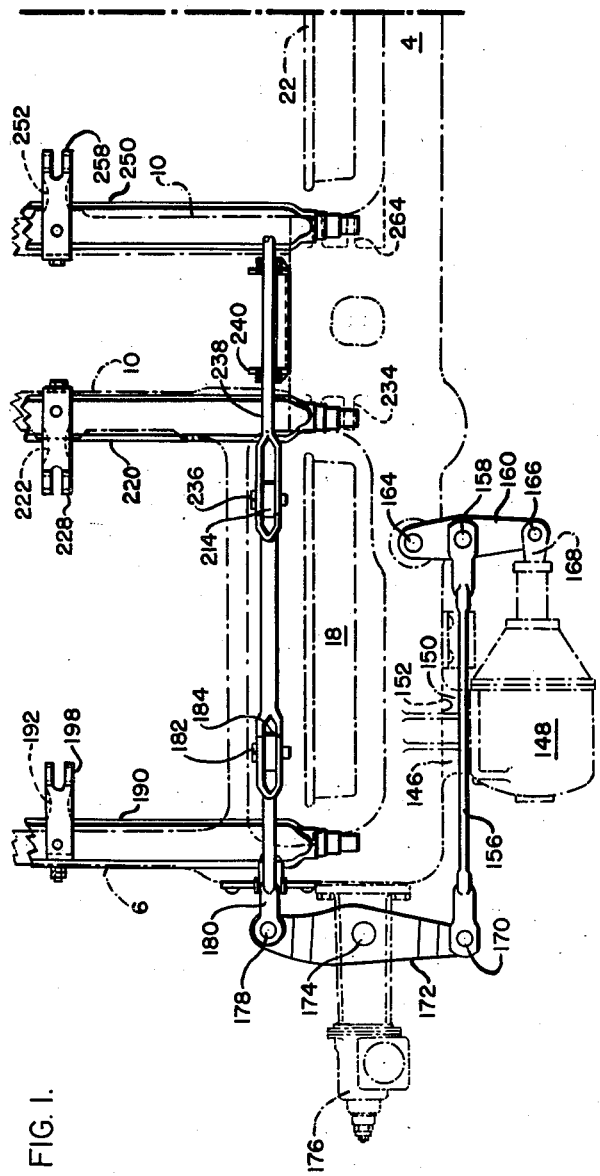
Figures 1 and 1A are fragmentary top plan views showing one half of a truck and brake structure embodying my invention, Figure 1 showing one end thereof and Figure 1A the other end.

Describing the invention in detail, the truck structure comprises a framework, generally designated 2, including a side frame or side rail 4 at each side of the truck, said side rails being connected at their ends by end rails 6, 6 and by spaced transoms 8, 8 and 10, 10 disposed respectively at opposite sides of the transverse center line of the truck, said transoms being adapted to support a span bolster (not shown) in the usual manner, as will be readily understood by those skilled in the art. The side rail 4 is provided at opposite ends thereof with spaced pedestal legs 12, 12 and 14, 14 which are adapted for connection in the usual manner to journal means on the associated end wheel and axle assemblies 16 and 18, respectively. The side rail 4 is also provided intermediate its end with spaced pedestals 20, 20 adapted for connection with journal means (not shown) of the intermediate wheel and axle assembly 22.

On the side frame 4 adjacent one end thereof is formed an integral bracket 24 to which is secured a cylinder 26 as by fastening means 28 (Figure 3). The cylinder, of course, may be cast integral with the bracket. As illustrated, the bracket is formed with spaced portions 30 and 32 defining an opening 34 therebetween through which extends a pull rod 36. The pull rod 36 is pivotally connected as at 38 at one end to a dead cylinder lever 40 intermediate the ends thereof. The inner end of the dead cylinder lever is pivoted as at 42 to the side frame 4 and the outer end of the cylinder lever is pivoted as at 44 to the piston 46 associated with the cylinder 26. The other end of the pull rod 36 extends beyond the adjacent end of the side rail and is pivotally connected as at 48 to the outer end of a horizontally disposed dead lever 50, the dead lever 50 being pivoted as at 52 intermediate its ends to an automatic slack adjuster 54 mounted on the adjacent end of the side frame 4. The inner end of the lever 50 is pivoted as at 56 to one end of a pull rod 58, the other end of said pull rod being connected as at 60 to the upper end of a live truck lever 62 positioned on the outer side of the associated end wheel and axle assembly 16. The lower end of the live truck lever 62 is pivoted as at 64 to a fulcrum 66 carried by a transversely extending brake beam 68 disposed outwardly of the associated wheel and axle assembly 16.

The brake beam 68 is provided with a fulcrum 70 substantially at the longitudinal center line of the truck, said fulcrum 70 being connected to the lower end of a combination balance and safety hanger 72, the upper end of said hanger 72 being pivoted as at 74 to a resilient support member 76 mounted on the adjacent end rail 6 of the truck frame.

At the end of the frame beam is connected or pivoted the lower end of a support hanger 78 and a brake head and shoe assembly 79 adapted for engagement with the periphery of the associated wheel of the assembly 16. The upper end of the hanger 78 is pivoted as at 80 to a bracket 82 on the adjacent end rail 6.

The live truck lever 62 is pivoted intermediate its ends as at 84 to a pull rod 86 adjacent one end thereof, the adjacent end of said pull rod 86 extending between spaced ears of a guide bracket 88 (Figure 3) mounted on the adjacent end rail 6, said bracket 88 cooperating with said rod 86 to support the rigging and for limiting lateral motion of the brake rigging.

The opposite end of the pull rod 86 is pivoted as at 90 to a live truck lever 92 disposed on the inner side of the associated wheel of assembly 16, the live truck lever 92 being pivoted at its lower end as at 94 to a fulcrum 96 carried by a brake beam 98 extending transversely of the truck adjacent the inner side of the wheel and axle assembly 16.

The brake beam 98 is provided at substantially the longitudinal center line of the truck with a fulcrum 100 connected to the lower end of a combination balance and safety hanger 102, the upper end of said hanger 102 being pivoted as at 104 to a bracket 106 connected to the adjacent transom 8.

The brake beam 98 provides at each end a connection for the lower end of a support hanger 108 and also a mounting for a brake head and shoe assembly 109 which is adapted to engage the periphery of the associated wheel of the assembly 16.

The upper end of the hanger 108 is pivoted as at 110 to a bracket 112 formed on the inboard side of the side frame 4.

The upper end of the live truck lever 92 has a pivotal, adjustable connection as at 114 to one end of a pull rod 116, said pull rod passing over the transoms 8, 8 and being guidably supported in a bracket 118 connected to the side rail 4. The opposite end of the pull rod 116 is pivoted as at 120 to the upper end of a live truck lever 122, the lower end of which is pivoted as at 124 to a fulcrum 126 carried by a brake beam 128 disposed on one side of the intermediate wheel and axle assembly 22.

The brake beam 128 is provided with a fulcrum 130 adjacent the longitudinal center line of the truck and the fulcrum 130 provides a connection for the lower end of a combination balance and safety hanger 132, the upper end of said hanger 132 being pivoted as at 134 to a support member 136 mounted on the adjacent transom 8. The brake beam affords a connection at each end for the lower end of a support hanger 140, the upper end of said hanger being pivoted at at 142 to a bracket 144 formed on the side frame 4. Each end of the brake beam also affords a mounting for a brake head and shoe assembly 145 adapted for engagement with the periphery of the associated wheel of the wheel and axle assembly 22.

Considering now the opposite end of the truck frame, it will be noted that the brake rigging and linkage is substantially the same as that heretofore described and comprises an integral bracket 146 formed on the frame 4 adjacent said opposite end thereof, the bracket affording a connection and support for a cylinder 148 and being provided with spaced members 150, 150 defining an opening 152 through which extends a pull rod 156, the inner end of said pull rod 156 being pivoted as at 158 to a dead cylinder lever 160 intermediate the ends thereof. The inner end of the dead cylinder lever 160 is pivoted as at 164 to the side frame 4 and the outer end of the dead cylinder lever 160 is pivoted as at 166 to a piston 168 associated with the cylinder 148.

The outer end of the pull rod 156 extends beyond the adjacent end of the side frame 4 and is pivoted as at 170 to a substantially horizontally disposed dead lever 172, said dead lever 172 being pivoted as at 174 intermediate its ends to an automatic slack adjuster 176 mounted on the adjacent end of the side rail 4. The inner end of the dead lever 172 is pivoted as at 178 to one end of a pull rod 180, the opposite end of said pull rod 180 being pivoted as at 182 to the upper end of a live truck lever 184 disposed outwardly of the associated end wheel and axle assembly 18. The lower end of the live truck lever 184 is pivoted as at 186 to a fulcrum 188 on a brake beam 190, the brake beam 190 being disposed outwardly of the assembly 18 and extending transversely of the truck and being provided at substantially the longitudinal center line of the truck with a fulcrum 192 connected to the lower end of a combination balance and safety hanger 194. The upper end of the balance and safety hanger 194 is pivoted as at 196 to a support member 198 fixed to the adjacent end rail 6.

The ends of the brake beam each provide a support for a brake head and shoe assembly 200 adapted for engagement with the associated wheel and axle assembly 18 and also provide a connection for the lower end of a support hanger 202, the upper end of which is pivoted to a bracket as at 204 on the adjacent end rail 6. The live truck lever 184 is pivoted intermediate its ends as at 206 to a pull rod 208 adjacent one end thereof, the adjacent end of the pull rod 208 being guided by a bracket 210 on the adjacent end rail 6. The opposite end of the pull rod 208 is pivoted as at 212 to a live truck lever 214 intermediate the ends thereof, the lower end of said live truck lever 214 being pivoted as at 216 to a fulcrum 218 on the brake beam 220 which extends transversely of the truck on the inner side of assembly 18, said brake beam 220 being provided at substantially the longitudinal center line of the truck with a fulcrum 222 connected to the lower end of a combination balance and safety hanger 224, the upper end of which is pivoted as at 226 to a support member 228 secured to the adjacent transom 10. Each end of the beam affords a mounting for a brake head and shoe assembly 229 adapted for engagement with the periphery of the associated wheel of assembly 18 and also a pivotal connection for the lower end of a support hanger 230, the upper end of which is pivoted as at 232 to a bracket 234 formed on the side rail 4.

The upper end of the live truck lever 214 has a pivotal adjustable connection as at 236 with one end of a pull rod 238, the pull rod 238 passing over transoms 10, 10 and being guidably supported from the frame by means of a bracket 240. The opposite end of the pull rod 238 is pivoted as at 242 to the upper end of a live truck lever 244, the lower end of said live truck lever 244 being pivoted as at 246 to a fulcrum 248 pivoted on a brake beam 250, the brake beam 250 extends transversely of the truck adjacent the intermediate wheel and axle assembly 22 at a side opposite that at which the brake beam 128 is located.

The brake beam 250 is provided at substantially the longitudinal center line of the truck with a fulcrum 252 connected to the lower end of a combination balance and safety hanger 254, the upper end of which is pivoted as at 256 to a support member 258 connected to the adjacent transom 10. Each end of the brake beam 250 affords a mounting for a brake head and shoe assembly 259 adapted for engagement with the periphery of the adjacent wheel of the intermediate assembly 22 and also affords a pivotal connection for the lower end of a support hanger 260, the upper end of which is pivoted as at 262 to a bracket 264 formed on the side frame 4.

The live truck levers 122 and 244 are each connected to a pull rod 266 as at 268 and 270 respectively, adjacent the opposite ends thereof. The opposite ends of the pull rod 266 extend between ears 272, 272 and 274, 274 of the brackets 276 and 278 formed on the adjacent transoms 8 and 10, said brackets controlling through abutment with the pull rod 266 the lateral motion of the brake rigging associated with the intermediate wheel and axle assembly 22. The ears 272 and 274 are connected at the upper ends by means of webs 280 and 282, respectively. It will be appreciated that this construction provides for stress loading the brake rigging in such manner that the counter stresses as imposed by the rigging react against the ends of the truck frame, stressing the side member 4 in compression, whereby the necessity of providing bulky strengthening metal sections intermediate the ends of the side rail is avoided. Also, assembly of the rigging with the truck is simplified, the ends of the pull rod 266 entering pockets as defined by brackets 276 and 278 in the adjacent transoms 8 and 10.

Figure 1A:
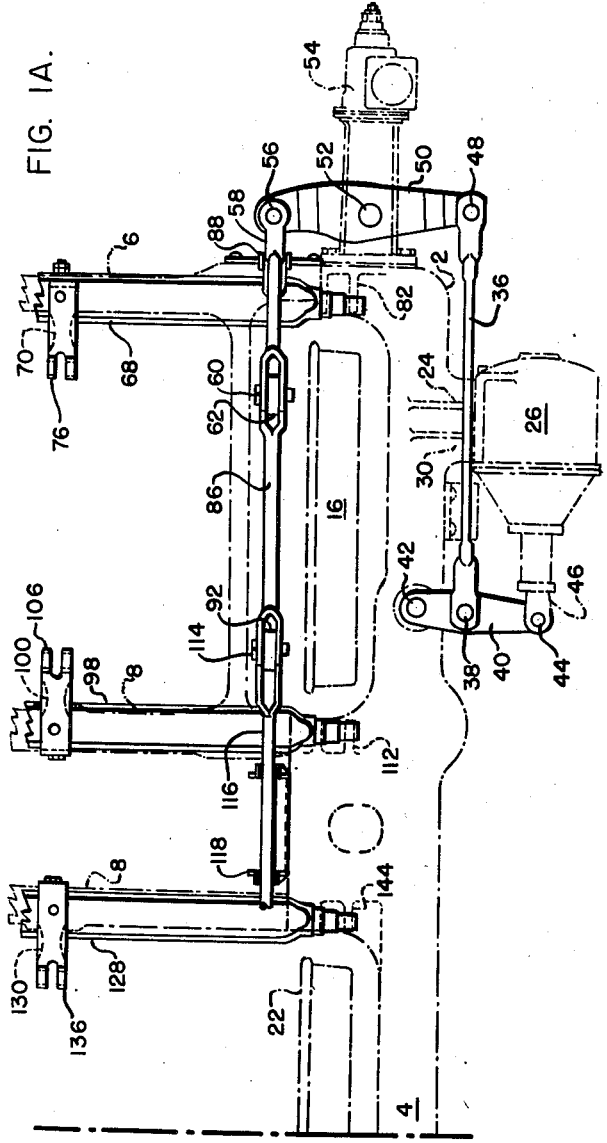

In operation and referring first to Figure 1A, actuation of the cylinder 26 causes the piston stem 46 to move to the left and rotate lever 40 in a clockwise direction, thereby moving rod 36 to the left and rotating lever 50 in a clockwise direction, thereby moving rod 58 to the right and pulling the lever 62 to the right (Figure 2A) and rotating lever 62 in a clockwise direction (Figure 2A), thereby applying the brake head assembly 79 against the wheel 16. Movement of lever 62 to the right moves rod 86 and lever 92 to the right (Figure 2A) and causes lever 92 to rotate in a counterclockwise direction and apply the brake head assembly 109 against the wheel 16. Movement of lever 92 to the right moves rod 116 to the right (Figure 2A) whereby the lever 122 is caused to rotate in a clockwise direction and apply the brake head assembly 145 against the wheel 22.

Figure 2:
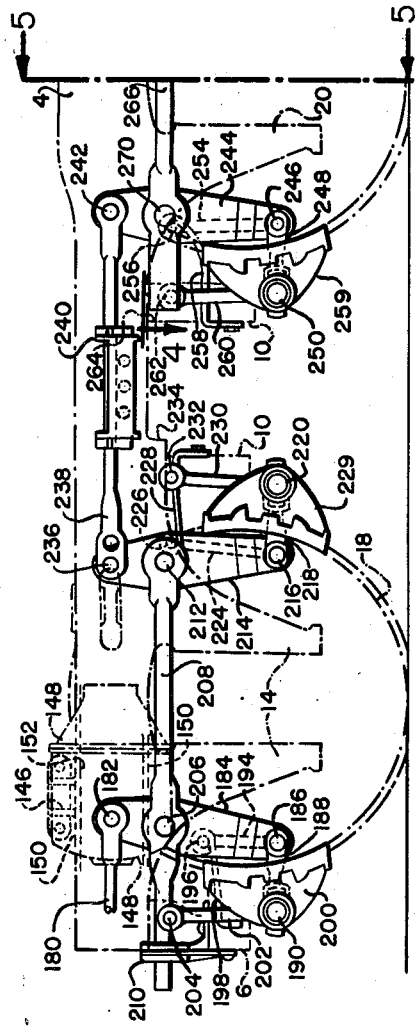
Figures 2 and 2A are side elevations respectively of Figures 1 and 1A.

Referring now to Figure 1, the cylinder 148 is actuated simultaneously with cylinder 26, causing piston stem 168 to move to the right and rotate lever 160 in a counterclockwise direction to move rod 156 to the right and rotate lever 172 in a counterclockwise direction whereby rod 180 is caused to move to the left together with lever 184, rod 208, lever 214, and rod 238 (Figure 2). After a predetermined movement of levers 184 and 214 to the left, lever 184 is caused to rotate in a counterclockwise direction applying brake head assembly 200 against wheel 18, and lever 214 is caused to rotate in a clockwise direction applying the brake head assembly 229 to the wheel 18. Movement of rod 238 to the left rotates lever 244 in a counterclockwise direction (Figure 2) whereby the brake head assembly 259 is caused to apply against the wheel 22. It will be noted that the braking forces exerted by cylinders 26 and 148 are transmitted between the levers 122 and 244 through the rod 266 which, as seen in Figure 4, it movable a limited distance longitudinally within the pockets in brackets 274 and 276, whereby each cylinder is effective to operate the entire brake rigging as hereinbefore described.

It will be understood that the braking pressures of cylinders 26 and 148 are substantially equal and that variation in the pressures is equalized through the brake rigging to thereby obtain the important advantage of equalizing the brake pressures on all of the brake head assemblies.

Figure 2A:
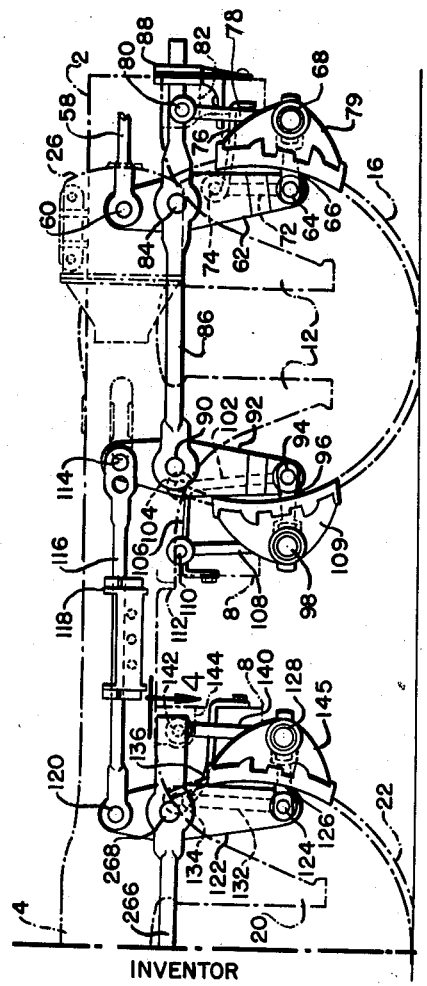

In addition to the fact that the arrangement affords a balancing of pressures between cylinders 26 and 148, each half of the brake rigging is functionally independent of the other half when one of the cylinders 26 or 148 becomes inoperative. Under these conditions if, for example, cylinder 148 should become inoperative, cylinder 26 will operate the adjacent end of the rigging up to and including the lever 122, the rod 266 being moved to the right (Figures 2A and 4) until the end thereof within bracket 276 abuts the inner wall of the bracket, as best seen in Figure 4, thus dead ending the rigging shown in Figures 1A and 2A at the intermediate wheel and axle assembly 22. It will thus be seen that even though the portion of the brake rigging shown in Figure 2 is inoperative, the portion shown in Figure 2A is operative. Similarly, if the cylinder 26 or the portion of the rigging shown in Figures 1A and 2A should become inoperative, the rigging shown in Figures 1 and 2 would still be operative.

It will be further noted that the connection between levers 122 and 244 is simple and that the guiding engagement between pull rod 266 and the brackets 272, 274 is simple and flexible to accommodate the assemblies 145 and 259 to follow the movement of the associated wheel.

I claim:

1. In a brake rigging, a truck frame including spaced transoms and a side rail, a power cylinder mounted on said side rail adjacent each end thereof, spaced end and intermediate wheels supporting said frame, brake rigging associated with said wheels and including live truck levers disposed at opposite sides of said intermediate wheel and other live truck levers disposed at opposite sides of each end wheel, and brake means connected to each lever for cooperation with the associated wheel, means interconnecting said levers including a pull rod interconnecting said first mentioned live truck levers, guide brackets on said transoms having spaced vertical portions receiving the ends of said pull rod therebetween, and an operative connection between each cylinder and the adjacent end of said rigging, said brackets being formed and arranged to accommodate movement of said pull rod to transmit braking pressures between said first mentioned levers from each power cylinder and accommodate movement of said rod with the associated portion of said rigging and intermediate wheel laterally of said truck.

2. In a railway car truck, a truck frame structure, spaced end and intermediate wheel and axle assemblies affording support therefor, brake rigging for said assemblies comprising truck levers arranged in pairs at opposite sides of each assembly, a tension rod connecting each pair of levers, means interconnecting certain levers of adjacent pairs, the tension rod connecting the levers associated with the intermediate assembly having ends extending into pockets in said frame, and power means on the outer side of the frame structure adjacent each end thereof each connected to one of the levers associated with the adjacent end assembly, said pockets being formed and arranged to accommodate movement of said last-mentioned rod longitudinally of the frame whereby said brake rigging is shiftable longitudinally of the frame to balance the braking pressures exerted by said power means.

3. In a railway car truck, a truck frame, a wheel and axle assembly disposed in supporting relation thereto, brake rigging for said truck including spaced levers disposed at opposite sides of said assembly, a rigid member interconnecting said levers, and guide means for guiding said member comprising pockets in said frame receiving the ends of said member therewithin, said pockets being formed and arranged to accommodate movement of said rigging together with said assembly laterally of said truck.

4. In a brake arrangement for a railway car truck, a truck frame, spaced power devices mounted on said frame, operatively unified floating brake rigging for said truck connected at spaced points to respective ones of said power devices, and abutment means on the frame arranged in adjacent relationship to the rigging for abutment with a portion thereof under certain conditions to dead end said rigging.

5. In a truck, a frame, spaced supporting wheel and axle assemblies, operatively unified brake rigging for said assemblies including levers at opposite sides of each assembly, the levers associated with one of said assemblies being interconnected intermediate their ends by a pull rod, spaced pockets on said frame loosely receiving the ends of said rod, and spaced power means connected to opposite ends of said rigging for simultaneously actuating the whole rigging under normal conditions, said rod being engageable with one of said pockets upon failure of either of said power means to dead end the rigging at said rod whereby the portion of said rigging between said rod and the operable power means may be actuated thereby.

6. In a truck, a frame, spaced wheel and axle assemblies, spaced power means carried by said frame, and operatively unified brake means for said assemblies connected at spaced points to respective power means and interconnecting the same whereby said power means are effective to transmit braking pressures and react against each other through said brake means.

7. In a railway vehicle, a truck structure including spaced wheel and axle assemblies, spaced power means mounted on said structure, operatively unified brake rigging for said assemblies connected at opposite ends to respective power means, said rigging comprising a floating linkage from end to end thereof for actuation by all of said power means under normal operating conditions, and means on said structure adapted to cooperate with said rigging to dead end the rigging intermediate said power means upon failure of one of said power means.

8. A railway car truck comprising a frame and spaced supporting wheel and axle assemblies, spaced power devices, operatively unified brake rigging connected at spaced points to respective devices and interconnecting said devices whereby the same are adapted to transmit braking pressures and react against each other through said rigging under normal operating conditions, said rigging including a pair of levers disposed at opposite sides of one of said assemblies and interconnected intermediate their ends by a pull rod, said pull rod having ends adapted to abut against cooperating portions of said frame under certain conditions to dead end said rigging intermediate said points, said rod ends being spaced from said portions during normal operation of said rigging and power means.

9. In a truck, a frame, brake rigging for said truck including a pair of spaced levers interconnected intermediate their ends by a pull rod, pockets in said frame receiving the ends of said rod therein, said pockets having surfaces at their inner ends abutable with respective ends of said rod to limit longitudinal movement thereof and having surfaces at opposite sides of each end of said rod to limit lateral movement thereof.

10. In a railway car truck, a truck frame and a supporting wheel and axle assembly, a brake beam extending transversely of the frame, brake heads journaled on opposite ends of said beam, each head carrying a shoe for engagement with its related wheel, a resilient support member secured to the frame, a fulcrum secured to the beam medial the ends thereof, a combination balance and safety hanger pivotally interconnected to said fulcrum and resilient member, a pair of spaced hangers each pivotally interconnected to an extremity of the beam and the frame, another fulcrum secured to the beam intermediate the ends thereof, and a truck lever pivoted to said second mentioned fulcrum.

EDWARD J. SIMANEK.

REFERENCES CITED

The following references are of record in the file of this patent:

UNITED STATES PATENTS

| Number | Name | Date |
|---|---|---|
| 1,967,478 | Pflager | July 24, 1934 |
| 2,149,496 | Baselt | Mar. 7, 1939 |
| 2,216,093 | Orr | Sept. 24, 1940 |